United States Patent [19]

Ishiguro

[11] Patent Number: 4,868,591
[45] Date of Patent: Sep. 19, 1989

[54] PHOTODETECTOR ELEMENT FOR OPTICAL RANGEFINDERS

[75] Inventor: Minoru Ishiguro, Saitama, Japan

[73] Assignee: Fuji Photo Film Co., Ltd., Kanagawa, Japan

[21] Appl. No.: 228,227

[22] Filed: Aug. 4, 1988

[30] Foreign Application Priority Data

| Aug. 4, 1987 | [JP] | Japan | 62-194998 |
| Aug. 27, 1987 | [JP] | Japan | 62-213616 |
| Sep. 8, 1987 | [JP] | Japan | 62-224884 |

[51] Int. Cl.$^4$ ............................................. G03B 3/00
[52] U.S. Cl. .................................. 354/402; 354/403; 354/432; 356/1
[58] Field of Search ................. 354/402, 403, 432; 356/1

[56] References Cited

U.S. PATENT DOCUMENTS

| 4,477,168 | 10/1984 | Hosoe | 354/403 |
| 4,579,438 | 4/1986 | Sato et al. | 354/403 |
| 4,675,517 | 6/1987 | Shiomi | 354/403 |
| 4,710,011 | 12/1987 | Ushiro | 354/403 |
| 4,720,723 | 1/1988 | Harunari et al. | 354/403 |

Primary Examiner—Russel E. Adams
Attorney, Agent, or Firm—Young & Thompson

[57] ABSTRACT

A photodetector element for use in a rangefinder of a camera comprises a first photoelectric element having a plurality of light receiving segments parallel to each other and adapted to provide a photoelectric output, and a second photoelectric element having a plurality of light receiving segments also parallel to each other with different available light receiving areas that increase from one side to the opposite side of the photodetector element to provide a photoelectric output that progressively varies from the one side to the other side of the photodetector element. The first and second photoelectric elements are electrically insulated from each other and so disposed that the light receiving segments thereof interfinger with spaces therebetween. The photodetector element provides two different photoelectric outputs from the first and second photoelectric elements whose intensities depend on the location on which incident light reflected from a subject falls. According to the ratio of the two photoelectric outputs, the distance of the subject is determined.

11 Claims, 6 Drawing Sheets

PHOTODETECTOR ELEMENT FOR OPTICAL RANGEFINDERS

BACKGROUND OF THE INVENTION

The present invention relates to a light receiving element of a subject distance detector or rangefinder for a camera which receives light reflected from a remote object to be photographed, so as to detect the distance from the camera to the subject.

There are various kinds of active-type subject distance detecting devices which have light projecting means for projecting light to a remote subject to be photographed and light receiving means for receiving the light reflected from the subject to determine the distance between the subject and the subject distance detecting device. In such subject distance detecting devices, the subject distance can be determined according to the position at which the light reflected from the subject falls, because the reflected light returns at different incident angles according to the subject distance and so falls on correspondingly different positions.

Such an active-type subject distance detecting device comprises a pair of photoelectric elements with their associated converging lenses disposed in front of them. These photoelectric elements have different surface patterns which receive light from a remote subject to be measured to provide different photoelectric outputs. Although the photoelectric output varies as the intensity of incident light, which depends on variations in the intensity of incident light upon the photoelectric element, the brightness of subject, and ambient light, variations of the intensity of incident light can be cancelled by the provision of the pair of photoelectric elements with different light receiving surface patterns. Therefore, the subject distance detecting device can accurately detect the subject distance.

Figure 1:
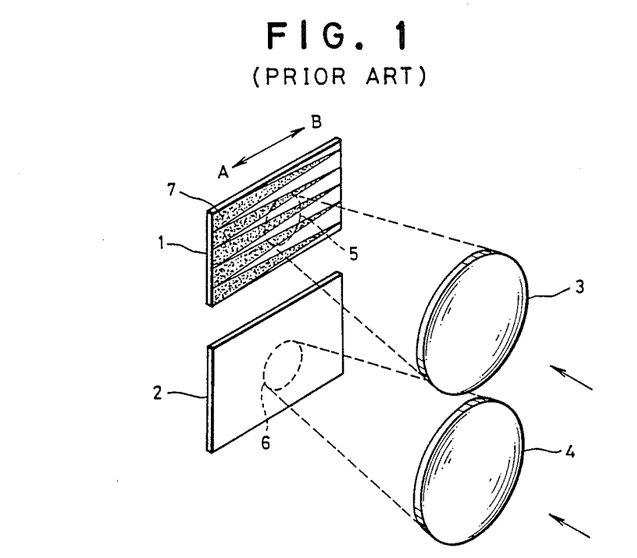
FIG. 1 is a schematic perspective view illustrating a prior art photodetector device used for rangefinders of cameras in which two photoelectric elements and converging lenses are used.

A typical example of such active-type subject distance detecting devices, as shown in FIG. 1, includes a pair of light receiving elements 1 and 2 disposed in a vertical direction and a pair of converging lenses 3 and 4 provided one individual to each light receiving element for converging incident light onto the respective light receiving elements. One of the pair of light receiving elements is formed with a sawtooth filter layer 7 on its light receiving surface to shield partially the light receiving surface from the light incident thereupon. The remaining light receiving element receives light over its entire light receiving surface. Light 5, 6 reflected from a remote subject, as is well known in the art, falls on the light receiving surface of each light receiving element at different positions in a direction shown by an arrowed line A-B according to the subject distance, because the incident angle of the light falling upon the light receiving surface varies depending upon the subject distance. If the intensity of light reflected from a subject is constant, the light receiving element 1 with the light shielding filter layer 7 provides a photoelectric output which is useful to provide subject distance information according to the position 5 on which the reflected light falls. However, the photoelectric output from the light receiving element generally varies depending upon the intensity of the incident light, even though the light falls at a constant incident angle and hence at the same location thereon. The intensity of light falling upon the light receiving element usually depends upon the reflectivity of the subject, the intensity of ambient light and so forth. Such variations of the intensity of incident light can be cancelled out by detecting also the intensity of the light reflected from the subject, by the light receiving element 2.

A problem with such subject distance detecting devices having a pair of light receiving elements is that the provision of two converging lenses one individual to each element gives rise to parallax effects due to the distance between the light receiving elements, as well as slight discrepancies of characteristics between the two light receiving elements and their associated converging lenses.

OBJECTS OF THE INVENTION

It is, therefore, an object of the present invention to provide a photodetector element used for subject distance detecting device which can accurately detect subject distances according to the intensity of photoelectric output from the element.

It is another object of the present invention to provide a photodetector element used for subject distance detecting devices which comprises a single photoelectric element.

SUMMARY OF THE INVENTION

The present invention provides first and second photoelectric elements which have a plurality of light receiving segments arranged in parallel with one another, electrically isolated from each other, and so disposed as to arrange the light receiving segments of the first and second photoelectric elements alternately to one another. The light receiving segments are formed so as to provide a photoelectric output that progressively varies from one side to the opposite side of the photodetector element for one of the first and second photoelectric elements and a constant photoelectric output for the remaining photoelectric element, according to the locations at which incident light falls on the photodetector element. The light receiving segments of that one of the first and second photoelectric elements varies as to available light receiving area in a direction from the one side to the opposite side so as substantially linearly to vary the photoelectric output therefrom.

According to a preferred embodiment of the present invention, the light receiving segments of that one of the first and second photoelectric elements are tapered toward one side while the light receiving segments of the remaining photoelectric element are rectangular and of uniform width.

According to another preferred embodiment of the present invention, the difference in available light receiving areas between each two adjacent light receiving segments of the first and second photoelectric elements decreases from that one side to the opposite side of the photodetector element and becomes zero on that opposite side of the photodetector element.

According to still another preferred embodiment of the present invention, the light receiving segments of the first and second photoelectric elements are all the same in width and length, but the light receiving segment of that one of the first and second photoelectric elements has available light receiving areas that decrease from the one side to the opposite side of the photodetector element. For varying the available light receiving area of the light receiving segment of that one of the first and second photoelectric elements, light shielding layers are formed on the light receiving segment intermittently applied thereto so as to define smaller divisions of available light receiving areas. The widths of the light shielding layers are equal for a single light receiving segment but vary from the one side to the opposite side of the photodetector element.

BRIEF DESCRIPTION OF THE DRAWINGS

The above and other objects of the present invention will become apparent from the following description taken in conjunction with the preferred embodiments thereof shown in the accompanying drawings in which.

DETAILED DESCRIPTION OF THE INVENTION

Figure 2:
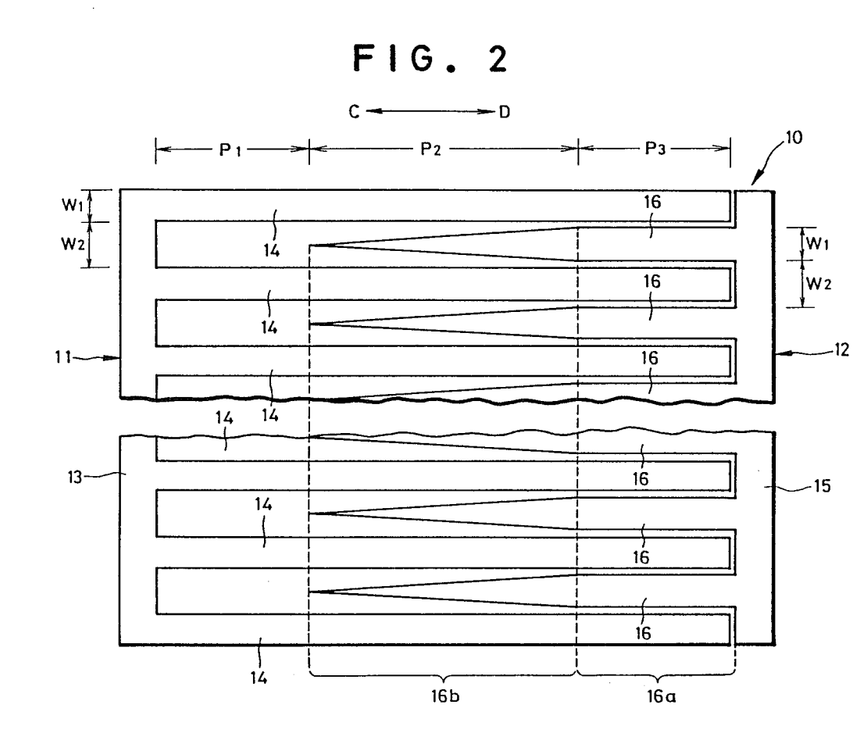
FIG. 2 is a top plan view partially broken away showing a photodetector element according to a preferred embodiment of the present invention.

Referring now to FIG. 2, there is shown a photodetector element 10 according to the present invention, used in an optical rangefinder of a camera. The photodetector element 10 comprises first and second photoelectric elements 11 and 12 shaped generally in the form of a comb which are electrically insulated from each other. The first photoelectric element 11 has a plurality of light receiving segments 14 which are formed integrally with a base 13 and arranged in the form of the teeth of a comb. These light receiving segments 14 have a uniform width $W_1$ and length, and are arranged at regular intervals $W_2$. The second photoelectric element 12 also has a plurality of light receiving segments 16 which are formed integrally with a base 15 and are arranged in the form of the teeth of a comb. These light receiving segments 14 and 16 interfinger and so are disposed alternately. Each light receiving segment 16 comprises a base section 16a shaped shorter than but as wide as the light receiving segment 14 of the first photoelectric element 14 and an elongated wedge section 16b extending from the base section 16a and tapering to a point. The base sections 16a of the light receiving segments 16 are arranged at the same intervals $W_2$ as the light receiving segments 14. The point of the elongated wedge-shaped section 16b of each light receiving segment 16 is located on the center line of the base section 16a. As is apparent in FIG. 2, the light receiving segments 14 of the first photoelectric element 11 are longer than the light receiving segments 16 of the second photoelectric element 12, and the width $W_1$ of the light receiving segments 14 and 16a is less than the intervals $W_2$.

The first and second photoelectric elements 11 and 12, which comprise a unit in which the light receiving segments 14 and 16 are arrayed alternately, is notionally divided into first to third light receiving zones $P_1$, $P_2$ and $P_3$ in a direction shown by an arrowed line C-D in FIG. 2. In the first light receiving zone $P^1$, there are only parts near the base 13 of the light receiving segments 14 of the first photoelectric element 11. In the second or intermediate light receiving zone $P_2$, there are intermediate parts of the light receiving segments 14 of the first photoelectric element 11 and the elongated wedge-shaped sections 16b of the light receiving segments 16 of the second photoelectric element 12, which vary in area in the direction C-D. In the third light receiving zone $P_3$, there are end parts of the light receiving segments 14 of the first photoelectric element 11 and the base sections 16a of the light receiving segments 16 of the second photoelectric element 12. In a preferred embodiment, the photodetector element 10 has a size of about 2.5×2.4 mm and the light receiving segments have a width $W_1$ of approximately 40 μm and an interval $W_2$ of approximately 50 μm.

Figure 3:
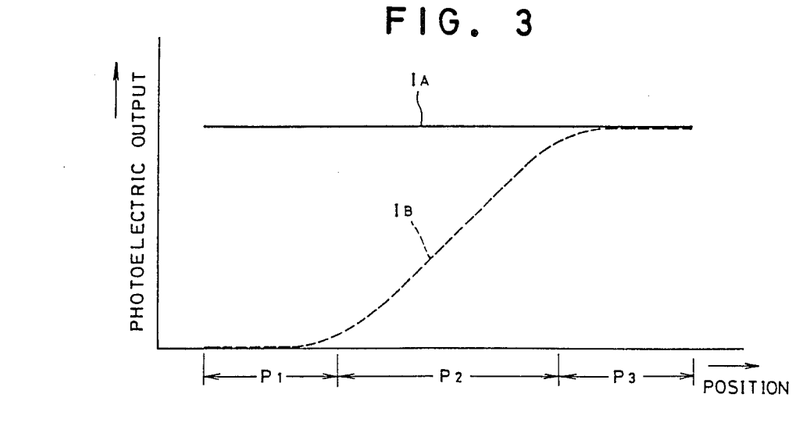
FIG. 3 is a graph showing photoelectric outputs from the photodetector element of FIG. 2.

In the operation of the photodetector element 10, the photodetector element 10 produces two photoelectric outputs $I_A$ and $I_B$ shown in FIG. 3 according to the location of the light reflected from a subject sighted by the rangefinder. Specifically, since the first photoelectric element 11 has its light receiving segments 14 uniform in width in the C-D direction, the photoelectric output $I_A$ from the first photoelectric element 11 is constant although the light reflected from the subject impinges on different regions of the first photoelectric element 11 in the C-D direction, according to the incident angles, which in turn depend on subject distances. On the other hand, since the second photoelectric element 12 has its light receiving segments 16 different in width in the C-D direction, the photoelectric output $I_B$ from the second photoelectric element 12 varies according to the locations along the light receiving segment 16 on which the light reflected from the subject impinges, again according to the incident angles and hence depending on subject distances.

In greater detail, the second photoelectric element 12 provides no photoelectric output in the first light receiving zone $P^1$ because it has no light receiving segment therein. But element 12 provides a photoelectric output varying depending on incident light positions in the intermediate light receiving zone $P_2$ because of the wedge shape of the light receiving segments 16b. Finally, element 12 provides a photoelectric output independent of incident light positions in the third light receiving zone $P_3$ because of the uniform width of light receiving segments 16a. Thus as shown in FIG. 3, the photoelectric output $I_B$ from the second photoelectric element 12 is zero in the first light receiving zone $P_1$, but increases substantially linearly from zero to a value equal to the photoelectric output $I_A$ from the first photoelectric element 11 in the intermediate light receiving zone $P_2$, and thereafter is constant and equal to the photoelectric output $I_A$ from the first photoelectric element 11 in the third light receiving zone $P_3$. It is to be noted that the photoelectric output $I_B$ slightly curves in the boundary zones between the first and intermediate light receiving zones $P_1$ and $P_2$ and between the intermediate and third light receiving zones $P_2$ and $P_3$, because the incident light falls in a circle and not as a point.

Because the photoelectric output from each of the first and second photoelectric elements 11 and 12 is constant unless the brightness of the subject varies, therefore, the ratio between the two photoelectric outputs $I_{11}$ and $I_{12}$, namely $I_B/I_A$, is independent of changes in the brightness of the subject. The output ratio $I_B/I_A$ is constant as long as light falls on the photodetector element 10 at a constant incident angle or at a constant position, and varies only according to changes of incident angle of the light, that is, only with charges in subject distance.

Figure 4:
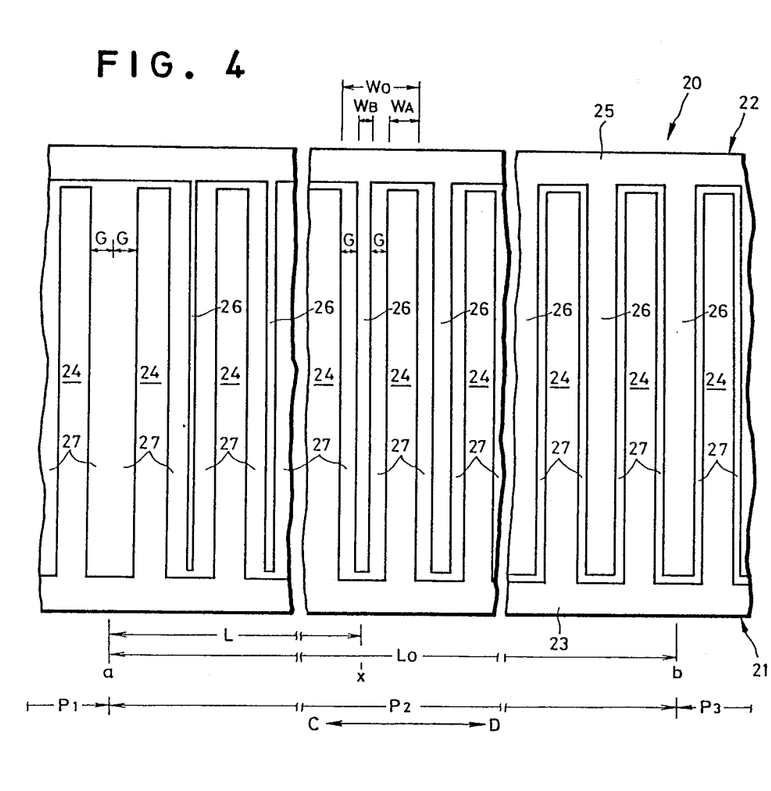
FIG. 4 is a top plan view similar to FIG. 2 showing a photodetector element according to another preferred embodiment of the present invention.

Referring now to FIG. 4, there is shown a photodetector element 20 according to another preferred embodiment of the present invention which is used in a photo-optical rangefinder of a camera. The photodetector element 20 comprises first and second photoelectric elements 21 and 22 shaped generally in the form of combs with interfingering teeth, which are electrically insulated from each other. The first photoelectric element 21 has a plurality of light receiving segments 24 formed integrally with a base section 23, and arranged at regular distances $W_0$ in parallel with each other and having a constant width $W_A$ and length. The second photoelectric element 22 also has a plurality of light receiving segments 26 formed integrally with a base section 25, and arranged in parallel with one another. As is seen in FIG. 4, these light receiving segments 24, 26 are arranged alternately and in parallel with spaces 27 of a width G between them. One of the light receiving segments 26 of the second photoelectric element 22 at a distance L has a width $W_B$ and the width G of the spaces 27 adjacent the light receiving segment 26 at the distance L are given as follows:

$$W_b = L/L_0 \cdot W_A$$

$$G = (W_0 - W_A - W_B)/2$$

$L_0$ being the distance between positions "a" and "b" wherein the light receiving segments 26 of the second photoelectric element 22 having the least and greatest widths are located. The position "a" is on the centerline of the space between the light receiving segments 24 of the first light receiving element 21 in which the narrowest light receiving segment 26 having a width $W_0$ of zero is located, and the position "b" on the centerline of the separation between the light receiving segments 24 of the first light receiving element 21 in which the widest light receiving segment 26 with a width $W_B$ as wide as the width $W_A$ of the light receiving segments 24 is located. Distance L is the distance from the position "a" to a position "x" on the centerline between any two adjacent light receiving segments 24 of the first photoelectric element 21 and is less than the distance $L_0$. As will be apparent from the above description, the light receiving segments 26 have a width $W_B$ increasing from zero to the width $W_A$ of the light receiving segment 24 of the first photoelectric element 21 in the direction from the position "a" to the position "b". Therefore, the separations 27 decrease in width in the same direction. As is seen in FIG. 4, the light receiving segments 26 all have the same length.

In the photodetector element 20 thus constructed, there are only the light receiving segments 24 of the first photoelectric element 21 in a first light receiving zone $P_1$ defined between one side of photodetector element 20 and the position "a". There will be both light receiving segments 24 of uniform width and light receiving segments 26 of progressively increasing width in a second or intermediate light receiving zone $P_2$ defined between the positions "a" and "b"; and there will be light receiving segments 24 and 26 having the same width in a third light receiving zone $P_3$ defined between the position "b" and the opposite side of the photodetector element 20.

Assuming that the brightness of the subject is constant, the light the photodetector element 20 receives is constant in intensity but provides photoelectric outputs from the first and second photoelectric elements 21 and 22 which are given as the curves $I_A$ and $I_B$ shown in FIG. 3, respectively. It will be seen that only the output from 22 varies. Because the light receiving segments 14 of the first photoelectric element 11 have the same width $W_A$, the photoelectric output $I_A$ is constant regardless of the location on the first photoelectric element 11 whereon the reflected light from the subject falls depending on the subject distance. On the other hand, because there are no light receiving segments 26 in the fist light receiving zone $P_1$, the light receiving segments 26 varying in width in the intermediate light receiving zone $P_2$ and the light receiving segments 26 having the same width in the third light receiving zone $P_3$, the photoelectric output $I_B$ from the second photoelectric element 22 is variable depending on the location whereon the light reflected from the subject falls according to the subject distance. Specifically, the second photoelectric element 22 provides a photoelectric output $I_B$ which is zero in the first light receiving zone $P_1$, progressively increases in the direction C-D in the intermediate light receiving zone $P_2$, and is constant and equal to the photoelectric output $I_A$ from the first photoelectric element 21 in the third light receiving zone $P_3$.

Figure 5:
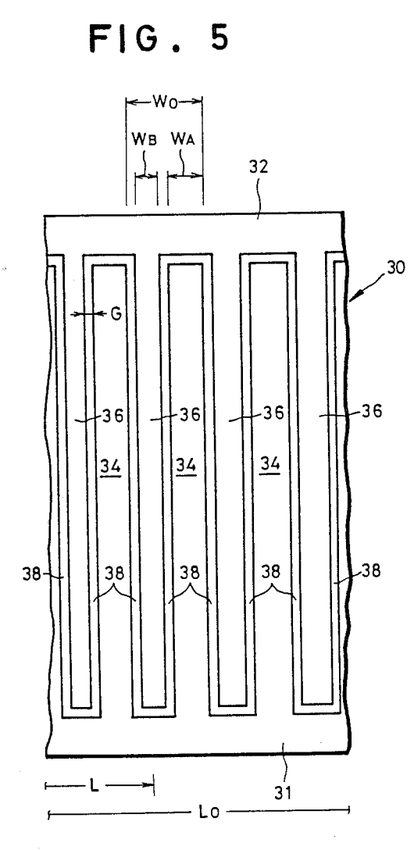
FIG. 5 is a top plan view similar to FIG. 4 showing a variation of the photodetector element of FIG. 4.

FIG. 5 shows a variation of the photodetector element 20 shown in FIG. 4. The photodetector element 30 also comprises first and second photoelectric elements 31 and 32 having a plurality of light receiving segments 34 and 36, respectively, which are arranged alternately with constant width G of spaces 38. The light receiving segments 34 of the first photoelectric element 31 have all the same width $W_A$. One of the light receiving segments 36 at a distance L has a width $W_B$; and the interval $W_0$ between the one light receiving segment 34 at the distance L and a light receiving segment 34 adjacent to the one light receiving segment 36 at the distance L is given as follows:

$$W_B = L/L_0 \cdot W_A$$

$$W_0 = W_A + W_B + 2G$$

Lengths $L_0$ and L are the same as those given in the previous embodiment shown in FIG. 4. The operation of the photodetector element 30 is the same as that of the photodetector element 20 shown in FIG. 4.

According to the photodetector element thus constructed, because the width G of the spaces can be independent of the changes of width between the light receiving segments 36 of the first photoelectric element 31 and can have a small constant value, the first and second photoelectric elements 31 and 32 can receive an increased amount of light in comparison with the first and second photoelectric elements 21 and 22 of the photodetector element 20 of FIG. 4.

Figure 6:
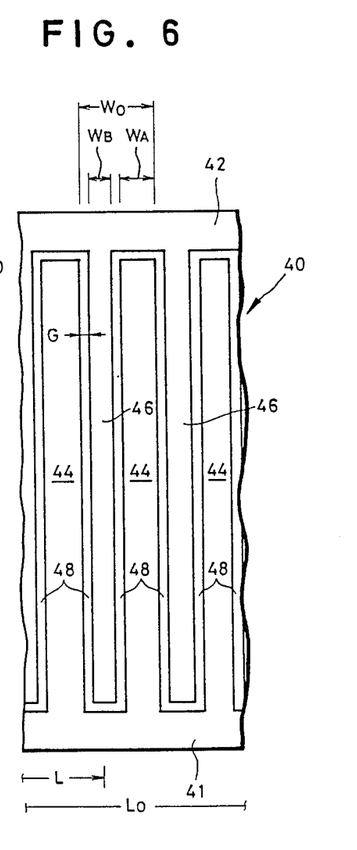
FIG. 6 is a top plan view similar to FIG. 5 showing another variation of the photodetector element of FIG. 4.

FIG. 6 shows another modification of the photodetector element 20 shown in FIG. 4. The photodetector element 40 of FIG. 6 comprises first and second photoelectric elements 41 and 42 having a plurality of light receiving segments 44 and 46, respectively, which are arranged alternately with spaces 48 between them of constant width G. The light receiving segments 44 of the first photoelectric element 41 are arranged at regular intervals $W_0$. In this embodiment, the widths $W_A$ and $W_B$ of the first and second photoelectric elements 41 and 42 at a distance L are given as follows:

$$W_B = L/L_0 \cdot W_A$$

$$W_B = W_0 - W_B - 2G$$

Lengths $L_0$ and L are the same as those given in the previous embodiments of FIGS. 4 and 5. The width $W_A$ of the light receiving segments 44 of the first photoelectric element 41 is greatest and is uniform in the first light receiving zone $P_1$, but becomes progressively less from the position "a" to the position "b" in the intermediate light receiving zone $P_2$, and is least and is uniform in the third light receiving zone $P_3$. On the other hand, the width $W_B$ of the light receiving segments 46 of the second photoelectric element 42 is zero in the first light receiving zone $P_1$, gradually becomes greater in the intermediate light receiving zone $P_2$, and is greatest and is equal to the least width $W_A$ of the light receiving segment 44 of the first photoelectric element 41 and is uniform.

Figure 7:
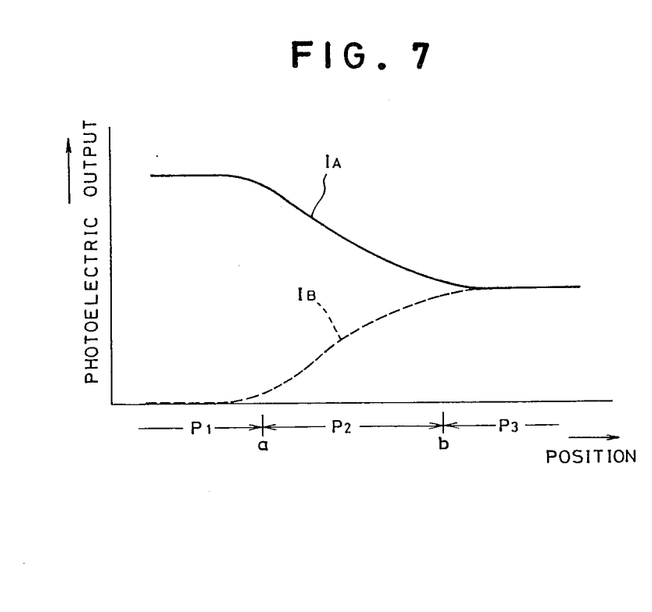
FIG. 7 is a graph showing photoelectric outputs from the photodetector element of FIG. 6.

The first and second photoelectric elements 41 and 42 thus constructed provide photoelectric outputs $I_A$ and $I_B$, respectively, as is shown in FIG. 7. As will be apparent from FIG. 7, the photoelectric output $I_A$ provided by the first photoelectric element 41 progressively decreases from the position "a" to the position "b" in the intermediate light receiving zone $P_2$ and becomes constant in the third light receiving zone $P_3$. On the other hand, the photoelectric output $I_B$ provided by the second photoelectric element 42 progressively increases from the position "a" to the position "b" in the intermediate light receiving zone $P_2$ and becomes equal to the photoelectric output $I_A$ from the first photoelectric element 41 at the position "b", and is constant in the third light receiving zone $P_3$. In the first light receiving zone $P_1$, the second photoelectric element 42 provides no photoelectric output but the first photoelectric element 41 provides a constant maximum photoelectric output $I_A$.

Figure 8:
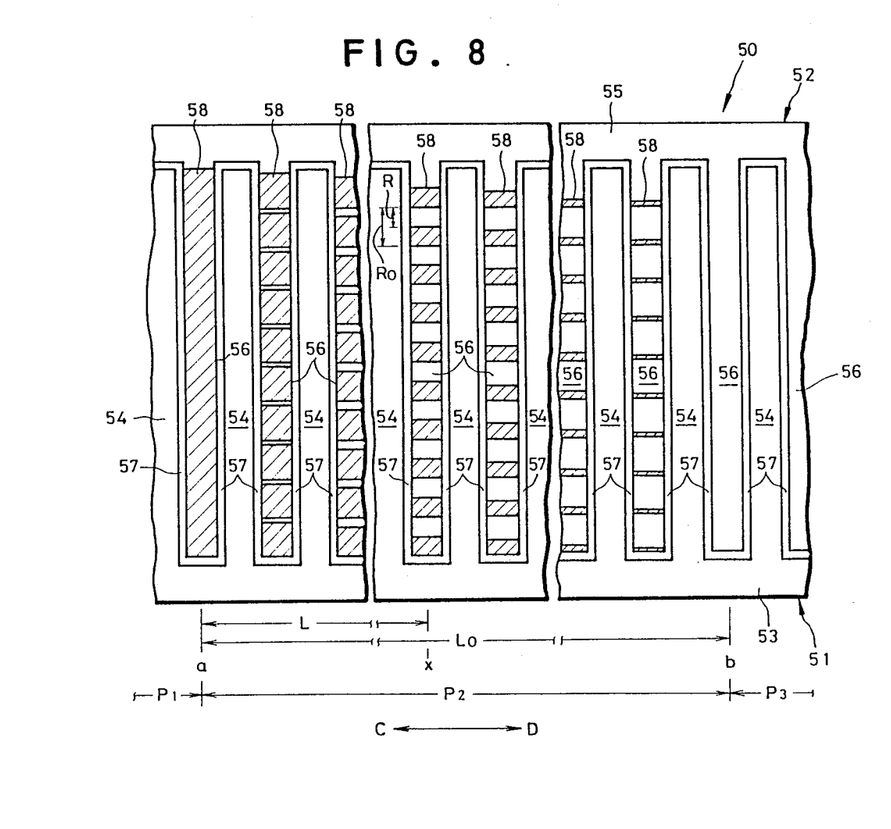
FIG. 8 is a top plan view similar to FIG. 2 showing a photodetector element according to still another preferred embodiment of the present invention.

Reference is now had to FIG. 8 showing a photodetector according to still another preferred embodiment of the present invention. A photodetector 50 comprises first and second photoelectric elements 51 and 52 generally shaped in the form of combs with interfingering teeth, which are electrically insulated from each other. The first and second photoelectric elements 51 and 52 have a plurality of light receiving segments 54 and 56, respectively which are formed integrally with bases 53 and 55 and arranged in the form of the teeth of a comb. All these light receiving segments 54 and 56 have the same width and length and are arranged in parallel and alternately with one another at regular intervals. There is a space 57 with a constant width between each adjacent two light receiving segments.

The shaped parts of the light receiving segments 56 of the second photoelectric element 52 are thin aluminum films serving as light shielding layers applied by vacuum evaporation. Each of the light receiving segments 56 in the first light receiving zone $P_1$ is covered over all the surface thereof by the light shielding layer 58. In the light receiving zone $P_2$, the light shielding layer of each light receiving segment 56 is divided into smaller spaced divisions at regular intervals $R_0$ so as to form small light receiving divisions each having a width R. The smaller light receiving divisions are so formed as to have a width R which becomes progressively greater up to the position "b" on the photodetector element 50. In the third light receiving zone $P_3$, all the light receiving segments 56 are free from a light shielding layer. It is to be noted that, specifically, the positions "a" and "b" are respectively on the centerlines of the last light receiving segment 56 fully covered by the light shielding layer and of the first light receiving segment 56 completely free from any light shielding layer. The lengths L and $L_0$ and the position x are defined in the same manner as those of the previous embodiments.

The first and second photoelectric elements 51 and 52 provide photoelectric outputs $I_A$ and $I_B$ as shown in FIG. 3, respectively.

Figure 9:
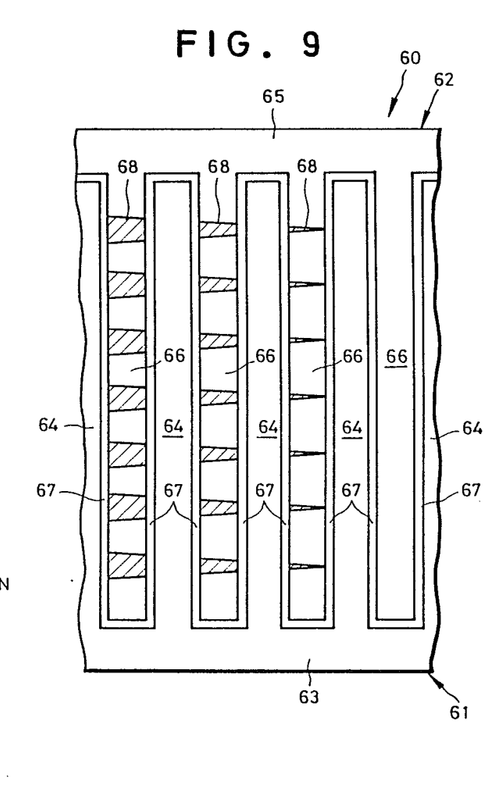
FIG. 9 is a top plan view similar to FIG. 8 showing a variation of the photodetector element of FIG. 8.

FIG. 9 shows a photodetector 60 which is a modification of the photodetector 50 shown in FIG. 8. The photodetector 60 comprises first and second photoelectric elements 61 and 62 having a plurality of light receiving segments 64 and 66 arranged alternately and in parallel with one another. The light receiving segments 66 of the second photoelectric element 62 in the intermediate or second light receiving zone $P_2$ are formed with divided light shielding layers 678. The only difference between the photodetectors 50 and 60 is in the shape of the divided light shielding layers 58 and 68. In particular, the divided light shielding layers 68 are tapered. Owing to the provision of the tapered divisional light shielding layers 68, the total area of each light receiving segment of the first photoelectric element 51 which receives incident light changes more progressively according to incident light location, so that the photoelectric output is more accurately analogous to the intensity of incident light than in FIG. 8. As a result, the photoelectric output from the first photoelectric element 61 is improved in linearity.

In any embodiment described above, the ratio between the photoelectric outputs $I_A$ and $I_B$, namely $I_B/I_A$, is independent of changes in the intensity of incident light due to changes in the reflectivity of subject, in the level of ambient light and so forth, and depends only upon the incident light location on the photodetector element. Therefore, the photodetector element according to the present invention can provide a photoelectric signal accurately indicating subject distances.

It will be understood that various changes in the form, details and arrangement will be apparent to those skilled in the art. Therefore, unless otherwise such changes depart from the scope of the present invention as defined in the appended claims, they should be construed as included therein.

What is claimed is:

1. A photodetector element for a rangefinder of a camera of the type providing a photoelectric output whose intensity depends upon the location on said photodetector element on which incident light falls, said photodetector element comprising:
 a first photoelectric element having a plurality of elongated rectangular light receiving segments of uniform width arranged at regular intervals parallel to each other;

a second photoelectric element having a plurality of light receiving segments that ar tapered and arranged at regular intervals parallel to each other;

said first and second photoelectric elements being electrically insulated from each other and so disposed that said light receiving segments of said first and second photoelectric elements alternate with each other.

2. A photodetector element as defined in claim 1, wherein said photodetector element is notionally divided into three consecutive light receiving zones, said light receiving segment of said first photoelectric element extending all over said three light receiving zones and said light receiving segment of said second photoelectric element continuously extending over only one side and an intermediate light receiving zone.

3. A photodetector element as defined in claim 2, wherein part of each said light receiving segment of said second photoelectric element is tapered in said intermediate light receiving zone and rectangular in said one side light receiving zone.

4. A photodetector element for a rangefinder of a camera of the type providing a photoelectric output whose intensity depends upon the location on said photodetector element on which incident light falls, said photodetector
- a first photoelectric element having a plurality of elongated rectangular light receiving segments parallel to each other;
- a second photoelectric element having a plurality of elongated rectangular light receiving segments parallel to each other;
- said first and second photoelectric elements being said light receiving segments of said first and second photoelectric elements alternate with each other with spaces therebetween;
- said light receiving segments of said first photoelectric element having all the same width and said light receiving segments of said second photoelectric element progressively varying in width.

5. A photodetector element as defined in claim 4, wherein said light receiving segments of said first photoelectric element are arranged at regular intervals, said spaces varying inversely in width as said segments of said second photoelectric element.

6. A photodetector element as defined in claim 4, wherein said spaces have all the same width.

7. A photodetector element for a rangefinder of a camera of the type providing a photoelectric output whose intensity depends upon the location on said photodetector element on which incident light falls, said photodetector element comprising:
- a first photoelectric element having a plurality of elongated rectangular light receiving segments parallel to each other;
- a second photoelectric element having a plurality of elongated rectangular light receiving segments parallel to each other;
- said first and second photoelectric elements being electrically insulated from each other and so disposed that said light receiving segments of said first and second photoelectric elements alternate with each other with spaces therebetween;
- said segments of said first element progressively increasing in width in on direction and said segments of said second element progressively increasing in width in the opposite direction and said spaces being of uniform width.

8. A photodetector element for a rangefinder of a camera of the type providing a photoelectric output whose intensity depends on the location on said photodetector element on which incident light falls, said photodetector element comprising:
- a first photoelectric element having a plurality of light receiving segments having uniform width and parallel to each other at regular intervals;
- a second photoelectric element having a plurality of light receiving segments having uniform width and parallel to each other at regular intervals;
- said first and second photoelectric elements being electrically insulated from each other and so disposed that said light receiving segments of said first and second photoelectric elements alternate with each other with spaces therebetween;
- said light receiving segments of said first photoelectric element being so formed as to have an available light receiving area that progressively increases toward one side of said photodetector element and is equal to that of said light receiving segments of said second photoelectric element on said one side of said photodetector element.

9. A photodetector element as defined in claim 8, wherein said available area of each of a plurality of said light receiving segments of said first photoelectric element is defined by spaced light shielding layers applied thereto.

10. A photodetector element as defined in claim 9, wherein said light shielding layers are tapered to increase in width toward said one side.

11. A photodetector element as define din claim 8, wherein said light shielding layer is a vacuum evaporated thin aluminum film.

* * * * *